G. E. BAILEY.
WATER SOFTENER.
APPLICATION FILED MAY 16, 1911.
1,092,327.
Patented Apr. 7, 1914.
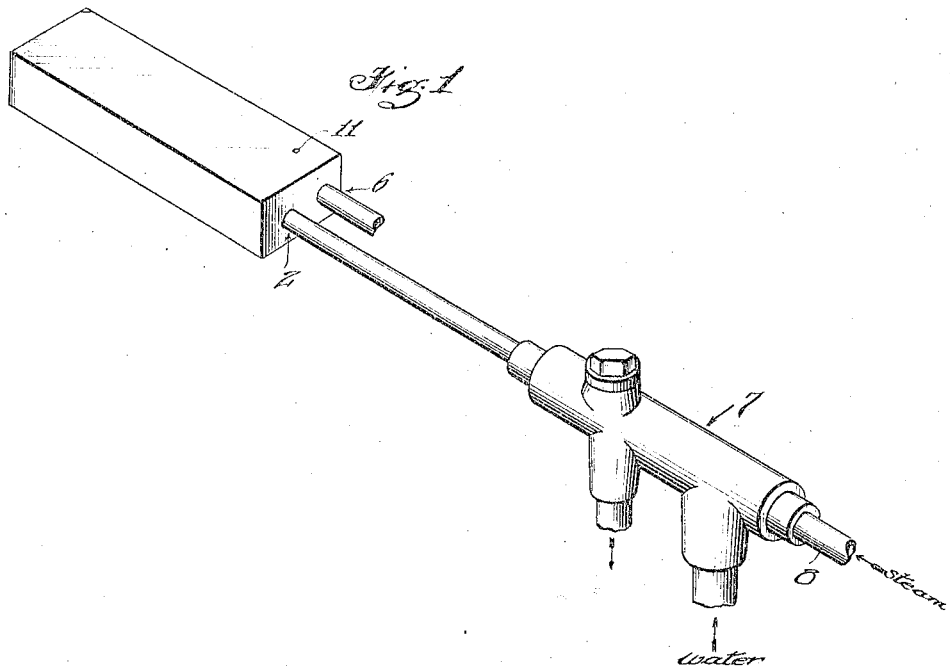
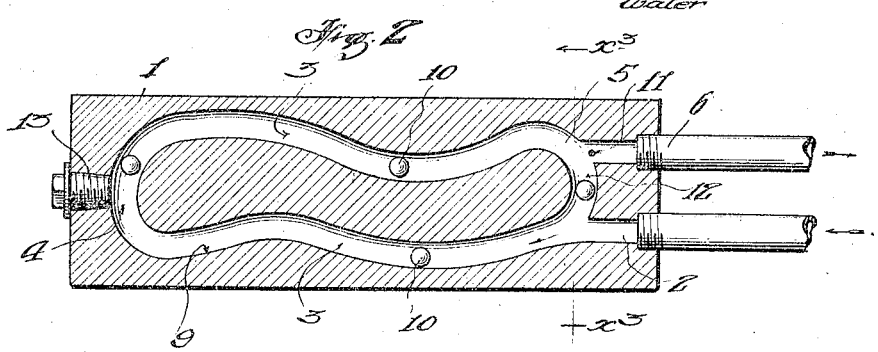
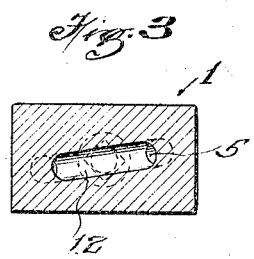
Witnesses:
J. M. Mansfield
O. H. Shelton
Inventor,
Gilbert E. Bailey;
by Townsend & Graham
his attys.

UNITED STATES PATENT OFFICE.

GILBERT E. BAILEY, OF LOS ANGELES, CALIFORNIA, ASSIGNOR TO THE FERROCHEM COMPANY, OF LOS ANGELES, CALIFORNIA, A CORPORATION OF CALIFORNIA.

WATER-SOFTENER.

1,092,327.

Specification of Letters Patent.

Patented Apr. 7, 1914.

Application filed May 16, 1911. Serial No. 627,557.

*To all whom it may concern:*

Be it known that I, GILBERT E. BAILEY, a citizen of the United States, residing at Los Angeles, in the county of Los Angeles and State of California, have invented a new and useful Water-Softener, of which the following is a specification.

The object of my invention is to provide a water softener composed of a composition of metals which have an affinity for minerals, acids or alkalis contained in solution in water, which is provided with a substantially horizontal tortuous passage through such body, and balls composed of a composition metal arranged to travel within such substantially horizontal passage, whereby the water to be purified in passing from its source to the boiler is brought into intimate contact with the metallic balls and the metals of the horizontal body, whereby minerals, acids or alkalis are brought into contact with metals having an affinity therefor.

The principal object of my invention is to provide a water softener of this class in which the greatest length of passage for the balls may be secured in the smallest amount of space and the balls be caused to race continuously therein when water is passing through the passage-way thus continuously abrading the walls of the passageway.

My invention consists in providing an elongated, horizontal body having a substantially horizontal, continuous, tortuous passage-way therethrough, and balls arranged within the substantially horizontal tortuous passage-way which are acted upon by a current of water to force them around such passage-way thus abrading the walls of the passageway.

My invention particularly consists in providing a flat rectangular body in cross-section of extended length longitudinally made of a composition of metals suitable for clarifying water and providing a continuous passage-way within such body extending from one end to a point near the outer end of such body from which it returns to the point of beginning, a water inlet into such passageway at one end of such body, and a water outlet therefrom adjacent to the water inlet, and balls within the passage-way adapted to race therein and abrade the walls of the passageway.

My invention further consists in providing a water softener of the character described which, while requiring the minimum amount of metal to construct the same and providing the greatest length of passage or ball race-way, is composed of a composition consisting of aluminum, iron and zinc.

I have discovered that a composition of metallic aluminum and pure iron combined with zinc produces a composition which will neutralize all minerals carried in solution in water when such water is brought into intimate contact therewith.

The composition of pure iron and zinc employed by me is that produced by the process set forth in my application for United States Letters Patent filed by me November 28, 1910, Serial Number 594,585, and the metal produced thereby is called by me "ferrochem". This metal when combined with metal aluminum in about the proportions of twenty five or less per cent. of "ferrochem" to seventy five per cent. or more of aluminum produces a composition which may be readily cast in molds to form a body having a passage or passages for water and at the same time possesses the chemical qualities of readily combining with all minerals carried in solution and neutralizing them.

The accompanying drawings illustrate a preferred form of arrangement of my invention.

Figure 1 is a perspective view of an apparatus adapted to receive water from a steam injector. Fig. 2 is a horizontal sectional plan showing the water passages and wearing means. Fig. 3 is a transverse section on line $x^3$—$x^3$ Fig. 2.

The body 1 is cast of a metal consisting of about seventy five per cent. or more of aluminum and twenty five per cent. or less of "ferrochem" and is provided with a water inlet 2 which communicates with the tortuous water passage 3 molded to traverse the body in a longitudinal direction to a point near the end 4 thereof at which point it turns in a curve and returns to the end 5 and terminates at outlet 6 from which point the water is conducted to any suitable boiler or receptacle.

I have shown an ordinary steam water injector 7 arranged to furnish a supply of water to the inlet 2. Such steam water injector by its action heats the injected water up to a sufficient point by admitting steam through the steam pipe 8 to cause the minerals contained in the water to be readily neutralized by contact with the walls 9 and balls 10 in the passage 3. The balls 10 lying in the passage 3 are caused to travel longitudinally of the body 1 and around the curved way at end 4 to return toward the end 5 where their further travel is arrested by the pin 11 at the junction of the outlet 6 and the by-pass 12. The passage 3 gradually rises in an upwardly direction from the inlet 2 to the outlet 6 and the by-pass 12 is arranged to form a ball passageway from such outlet 6 to the passage at the inlet 2. A plug 13 is provided in the end 4 which may be removed for the purpose of replacing worn out balls or cleaning the passage from any obstruction. The pin 11 being located at the junction of the outlet and the by-pass 12 stops the balls from continuing along with the outflowing water and their gravity causes them to roll down the said by-pass into the passage where they are caught by the current of flowing water and are raced around the passageway until again brought into contact with the pin. The current of flowing water through the passage causes the balls to constantly strike and abraid against one another and against the walls of the passage to thereby break off any accumulations of material that might form thereon and also keeps the balls and walls of the passage bright and active to chemical union with the minerals carried by the water in solution. The action of the balls racing through the passage also serves to abraid or wear particles from both the balls and the walls of the passage which is readily acted upon by the minerals carried by the water.

In operation the body is placed where the water is warmed before entering through the inlet and I have shown a steam injector as the means for accomplishing that effect, but it will readily suggest itself to others skilled in the art that such body may be placed between a boiler and ordinary cooking range provided with a water back heater and to receive such heated water therefrom.

The action of the composition of the body is to combine in chemical union with whatever minerals are carried in the water and thereby neutralize the same, the chemical union of the minerals and the metal composition being evidenced by a coagulation of the minerals and the softening of the water.

The balls 10 are preferably made of the same metals as the body 1, and a number of them sufficient to practically fill the passage 3 are provided, and when water is admitted through the inlet 2 the balls are caused to roll along the passage and strike against the tortuous walls thereof and thereby caused to rebound from one side of the passage to the other, bringing about an agitation of the flowing water. This rebounding brings all of such water at one time or another during its passage through the body into intimate contact with some part of the composition where the minerals carried in solution can be acted upon and a chemical union formed thereby.

By providing a body 1 of greater length than its width, I am enabled to mold a continuous passage-way therein having a greater length than in any other form in which such passage-way could otherwise be formed, and I thereby secure a longer distance for the balls to travel through the said passage-way than could otherwise be obtained, and I have discovered that in an apparatus wherein balls are caused to traverse a passage-way to produce a purification of water it is essential that the water be caused to traverse as great a distance in contact with the metals in order to secure the proper reaction upon the minerals, acids or alkalis contained in solution therewith.

What I claim is:—

1. A water purifier comprising a composition member having a U shaped passage therein, an inlet pipe for feeding water to said passage, an outlet pipe for taking water from said passage, balls of a material suited to abrade the walls of said passage, and a plug for closing an opening in said composite body, said opening being adapted to render easy the insertion and removal of said balls, said composite body also being provided with an inclined passage connecting the ends of said inlet and said outlet pipes down which said balls are impelled by gravity.

2. The combination with a boiler feed pipe, of a chamber disposed in the line of the feed pipe, and a body whirled therein by the water passing through said chamber, said body and said chamber being of a metallic alloy suited to correct the impurities in the water.

3. The combination with a boiler feed pipe, of a chamber arranged in the line of said pipe having a series of bodies movable in said chamber, said chamber and said bodies being of a material suited to correct the impurities in the water.

In testimony whereof, I have hereunto set my hand at Los Angeles, California, this 3rd day of May, 1911.

GILBERT E. BAILEY.

In presence of—
F. M. TOWNSEND,
FRANK L. A. GRAHAM.